United States Patent [19]

Todenhagen

[11] Patent Number: 5,275,314

[45] Date of Patent: Jan. 4, 1994

[54] FRONT-MOUNTED SPARE TIRE RACK FOR SNOWPLOW HEADGEAR

[76] Inventor: Fred Todenhagen, HCR 62, Box 84, Kingman, Me. 04451

[21] Appl. No.: 935,595

[22] Filed: Aug. 26, 1992

[51] Int. Cl.[5] .............................................. B60R 7/00
[52] U.S. Cl. ............................. 224/42.01; 224/42.12;
  224/42.24; 224/42.45 R; 37/231; 37/236
[58] Field of Search ............... 224/42.06, 42.12, 42.13,
  224/42.21, 42.24, 42.45; 37/231, 234, 235, 236,
  266, DIG.; 172/776, 439, 248, 247; 280/727,
  762

[56] References Cited

U.S. PATENT DOCUMENTS

| | | | |
|---|---|---|---|
| 3,302,836 | 2/1967 | Herndon | 224/42.24 |
| 3,894,668 | 7/1975 | Chapman et al. | 224/42.24 X |
| 3,987,562 | 10/1976 | Deen et al. | 37/231 |
| 4,989,765 | 2/1991 | Huebner | 224/42.07 |
| 5,114,120 | 5/1992 | Bartelt et al. | 224/42.44 X |

OTHER PUBLICATIONS

Fisher Engineering, Snow Plow Owners Manual, pp. 1-11, no date.

Primary Examiner—Henry J. Recla
Assistant Examiner—Glenn T. Barrett
Attorney, Agent, or Firm—Stanley R. Jones

[57] ABSTRACT

The present invention makes beneficial use of, rather than replacing, a vehicle's snowplow headgear by combining the headgear with a tire/wheel mounting assembly. A headgear includes a lower horizontal support member parallel to the ground at about frame level, and a pair of substantially vertical uprights connected to the ends of the horizontal support member to form, when viewed from the front, a U or O-shaped support headgear structure. A power ram with a base is normally removably secured in a receiving socket on horizontal support member that forms the bottom of the "U/O" of the headgear. That ram is removed and the tire/wheel assembly is securely mounted in its place.

15 Claims, 3 Drawing Sheets

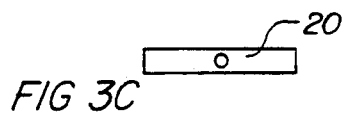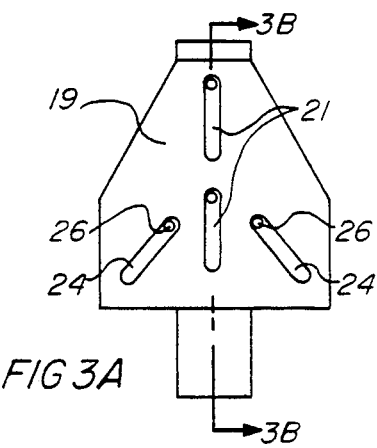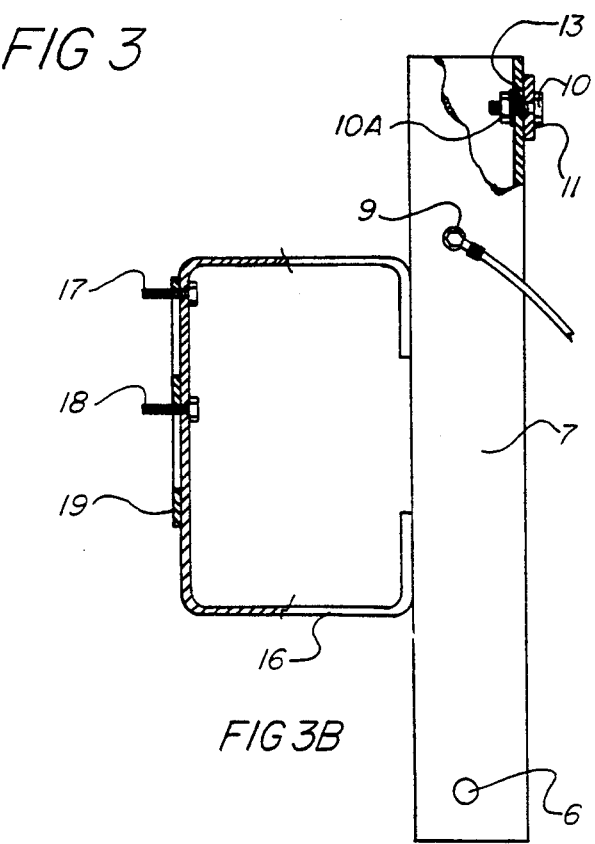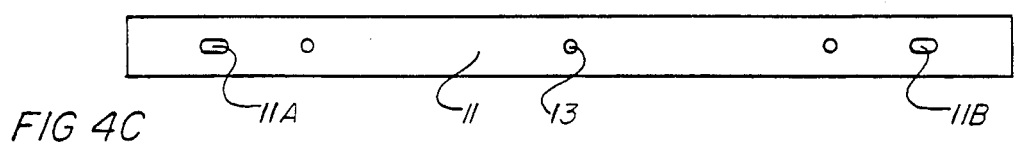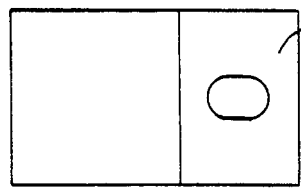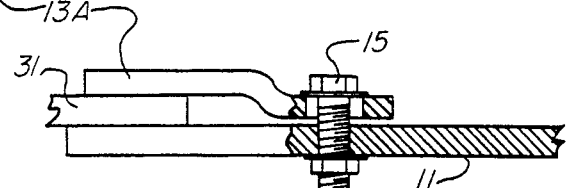

FRONT-MOUNTED SPARE TIRE RACK FOR SNOWPLOW HEADGEAR

BACKGROUND OF THE INVENTION

2. Field of the Invention

The field of the invention relates to a method and apparatus for front-mounted spare tire/wheel assemblies. It pertains more particularly to a method and rack for mounting a spare tire/wheel assembly on a snowplow headgear located at the front of a pickup truck or similar type utility vehicle.

2. Description of Prior Art

The use of a front-mounted tire rack is known in the prior art. For instance, U.S. Pat. Nos. 3,482,749 to Cooper and 4,989,765 to Huebner are fairly representative of the art illustrating a front-mounted rack. Such front-mounted carriers and/or racks often suffer numerous drawbacks associated with their design and their various methods of attachment. Heretofore, the racks required that the tire/wheel assembly support structures be attached to the vehicle bumper, frame and/or grill support structures.

While the frame is a secure mounting location, it is often awkward to implement. Grill and bumper attachments, while much more convenient for installation/removal purposes, are not at all secure. Over the long haul, such front mount-approaches suffer from rattles, instability, metal fatigue and serious attachment deficiencies.

Additional problems are faced if one seeks to use a front-mounted tire/wheel assembly on vehicles equipped with a snowplow unit. This invention represents a solution to such problems by putting the snowplow headgear to work as a solid and reliable support base.

To fully understand the present invention it is necessary to, at least casually, be familiar with the actual structure and operation of a snowplow's headgear. A snowplow headgear is a bulky steel structure that requires several large bolts to securely fasten the front-mounted headgear proper to several frame mounted supports under the vehicle. The headgear is in line with the frame and is equipped at its forward end with a snowplow blade. The headgear under the vehicle is adapted with pushplates that absorb and handle the large snow load forces against the blade.

Several different popular types of snowplow units are currently available. In all of them, however, the headgear has essentially vertical "U" or "O"-shaped uprights and horizontal structural member(s) in front of the vehicle's grill in order to provide a secure mounting location for a snowplow blade and a power blade lifting mechanism. The lifting of the blade is commonly done by a hydraulically or electrically operated ram or motor.

A ram's function is to lift the blade, hold it at a desired height and then, using gravity and the weight of the blade, lower the blade. An operator within the vehicle controls the lifting and releasing of a hydraulic lock created in the ram. In the art, the ram is often called a "lift cylinder" and it will sometimes be referred to in that manner in this application.

Several well known ram driving systems of the hydraulic type are in common use. Such systems require connections to the vehicle's engine and dashboard control levers by a series of mechanical and/or electrical cables. Either engine driven or electric driven hydraulic pumps are mounted in the engine compartment or sometimes on the headgear itself.

In any event, electrical cables also run between the vehicle and the snowplow lights. Additional headlight control switches are also installed within the cab. The operator manipulates these various controls, in a well known manner, to control the snowplow blade and lights during snow removing operations.

Headgear, regardless of type of manufacture, is awkward to install and remove. Furthermore, if removed it must also be stored. Thus, as a practical matter, for a large majority of instances, the headgear, once installed, is left in place on the vehicle throughout the summer months. In distinction, however, the snowplow blade is relatively easy to remove and re-install.

One typical popular model of a snowplow unit is manufactured by Fisher Engineering P.O. Box 529, Rockland Me. A copy of the owner's manual for such a Fisher snowplow is submitted herewith since it covers in detail the description and operation of a snowplow headgear which is useful for receiving the tire mount tire/wheel assembly of this invention. Applicant herewith incorporates by reference pages 3 through 10 of the attached owner's manual, as though those designated pages were set forth in full at this point in this application.

Having briefly reviewed the structure and operation of a typical snowplow unit, it now can be seen that several obstacles stand in the path of successfully employing a front-mounted tire rack on a vehicle equipped with a snowplow headgear. First, the headgear must be removed to clear a location for the front-mounted rack. As seen, such removal is both complex and time-consuming.

Next, removal of snowplow headgear involves cutting and/or disconnecting several mechanical and/or electrical connections, hydraulic lines and removing various pins, bolts and nuts. Generally speaking it normally takes an one hour or longer to accomplish this removal. More time is involved if, as is sometimes the case, electrical lines must be cut, spliced and fitted with suitable connectors.

Moreover, each time a conversion from snowplow to spare tire rack (or vice-a-versa) is required, the numerous connection/removal problems reappear. Additionally, it is always necessary to store the removed structure. In summary then, the time lost and inconvenience involved with these conversions largely offsets whatever usefulness the front-mounted tire racks of the prior art may have offered.

The invention, however, allows simple and easy installation and removal of a front-mounted tire/wheel assembly on a snowplow headgear. Moreover, the front-mounted tire rack of this invention has a unity mounting post and tire/wheel bracket that allows the entire spare tire rack (with spare tire still mounted) to be removed as a single unit. In summary, therefore, this invention teaches and claims, for the first time, a new and novel method and apparatus for a front-mounted tire rack on a snowplow headgear.

SUMMARY OF THE INVENTION

In accordance with the present invention, a snowplow headgear provides a central mounting location for a T-shaped unitary spare tire/wheel rack which is design compatible with the headgear used on most snowplows. The invention provides a method and apparatus for front-mounting a spare tire/wheel assembly on a snowplow headgear without requiring removal of the headgear. Instead, the headgear itself is used as a fastening and supporting structure for a front-mounted spare tire/wheel assembly.

Headgear, as known in the art, is fastened to a vehicle's frame and includes a lower horizontal support member that is essentially parallel to the ground at about frame level, a pair of substantially vertical uprights are connected along the lower horizontal support member to form, when viewed from the front of the vehicle a U or O-shaped headgear structure. This U/O-shaped structure is positioned essentially in the center and front of the vehicle.

Such headgear are normally provided with a lifting ram which has a power end and a base end, with the base end secured in a receiving socket that is located at the mid-point on the upper surface of a lower horizontal support member of the headgear. The power end of the ram normally extends in an upright direction where it is pinned or otherwise joined with a lifting plate that is used for controlling a snowplow blade, The method of the invention comprises the steps of removing the ram and lifting plate from the snowplow headgear and securing an upright post, in the receiving socket on the lower horizontal support member of the headgear, which socket previously held the base end of the ram. A second horizontal support is fastened across the vertical uprights of the headgear near the uppermost ends thereof. An upper end of the upright post is secured to that horizontal support. A tire/wheel mounting plate for housing a spare tire/wheel assembly is welded or otherwise fastened to the middle of the upright post. The upright post and the tire/wheel assembly may be easily installed/removed as a single unit.

My invention resides not so much in its ability to carry a spare tire but more importantly in its unique method of attachment on a snowplow headgear. This method of attachment distinguishes my invention from prior art, and offers several desirable advantages over front-mounted racks of the prior art.

OBJECTS OF THE INVENTION

It is an object of the present invention to install a front-mounted spare tire/wheel rack on vehicles equipped with a snowplow headgear without removing the snowplow headgear.

It is another object of the present invention to make useful application of installed snowplow headgear by housing thereon a front-mounted tire/wheel assembly which uses the headgear itself as it attaching and support structure.

It is also an object of the present invention to take advantage of the strength and stability of the snowplow headgear as a convenient and ready mounting platform for a spare tire/wheel rack.

It is a further object of the present invention to allow for a quick and easy return to the snowplow ready configuration.

It is a further object of the present invention to allow for a quick and easy removal and/or installation of the spare tire/wheel rack as a single unit, to or from, a snowplow headgear.

It is an even further object of the present invention to provide convenient stowage of a disconnected hydraulic line from a ram that is removed from the headgear in order to provide a mounting place for the tire/wheel assembly of this invention.

BRIEF DESCRIPTION OF THE DRAWINGS

FIG. 3 includes FIGS. 3A, 3B and 3C which depict some additional components of the front-mounted tire/wheel assembly of the invention.

FIG. 4 includes FIGS. 4A, 4B and 4C which depict some additional views of certain components of the front-mounted tire/wheel assembly of the invention.

DESCRIPTION OF THE PREFERRED EMBODIMENT

Figure 1:
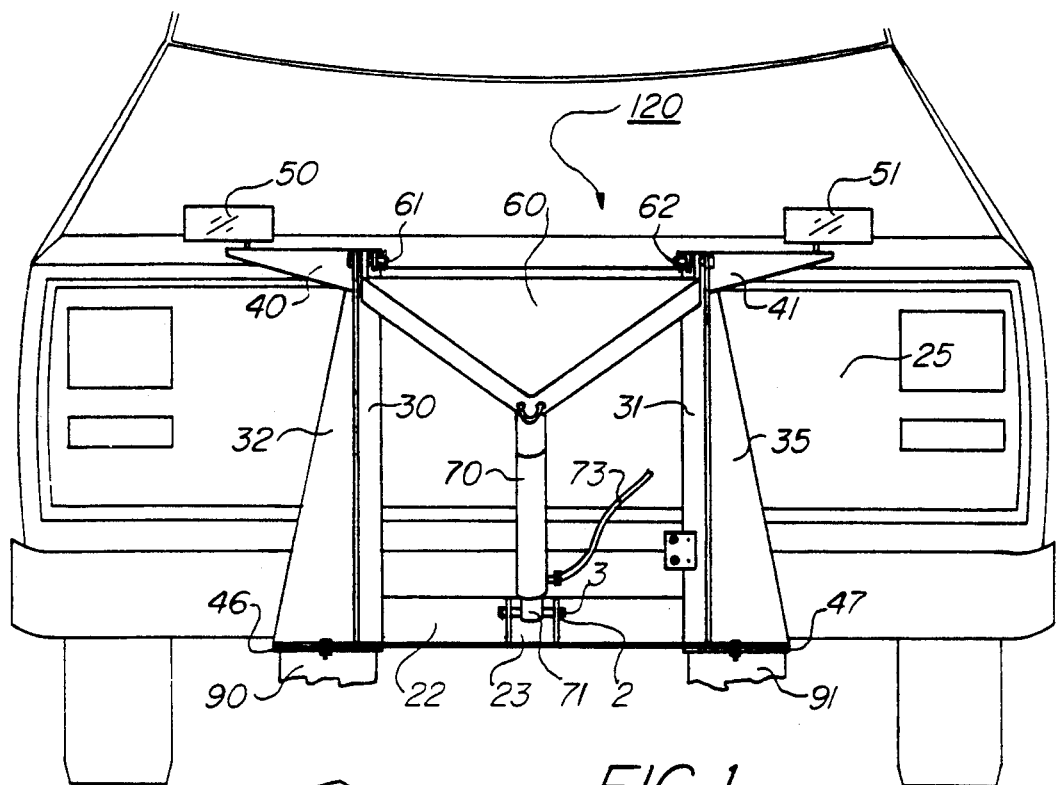
FIG. 1 illustrates one prior art type of snowplow headgear in a snowplow-ready configuration.

Installation of the snowplow headgear front-mounted spare tire/wheel assembly requires removal of certain snowplow related components normally located on the headgear. With reference now to the drawings, and in particular FIG. 1, the headgear associated with a commonly known type of snowplow unit is shown.

Basic snowplow units for vehicles consist primarily of three main structural components, namely (1) the frame bracket/member (pushplate) attachment support assembly (partially shown as 90, 91 in FIG. 1), (2) the snowplow blade (not shown) and (3) a lifting and controlling ram 70.

The frame bracket/member attachment assembly 90, 91, is located primarily underneath the vehicle and it extends just forward of the bumper and grillwork of the vehicle. This pushplate, or pushbeam, varies in design according to vehicle type. It is bolted, or otherwise fastened, adjacent to the vehicle frame (not shown). This pushplate attachment includes spaced girders running lengthwise adjacent to the sides of the vehicle frame.

Out beyond the front of the vehicle are located two headgear mounting plates shown partially as 90, 91. A headgear 120 is bolted to these plates at 46 and 47. Although headgear vary in design from one manufacture/model to the next, all of them are essentially similar in shape and function. The headgear for this invention provides a solid and secure attachment and support location for a front-mounted tire/wheel assembly.

As shown in FIG. 1, the forward portion 120 of the attachment includes a pair of strengthened right angle support brace structures 30, 32 and 31, 35 located in front of the vehicle's grill work 25. These right angle support braces are attached to the pushplate's mountings 90, 91 at locations designated 46 and 47. When viewed from the front, facing the vehicle, the headgear's support braces forms an essentially U-shaped structure. The support structure includes, at the lower part of the "U", a centrally-located lower horizontal support 22 running parallel to the ground at about frame level.

The two spaced apart vertically oriented uprights, 30 and 31, extend upwards from the frame level to about the vehicle's hood. These uprights 30, 31 are braced or otherwise strengthened by flanges located on braces 32, 35 in order to form a strong, rigid structure that is capable of supporting the raised snow plow blade that may weigh nearly 500 pounds.

Each upright, at the uppermost end, includes alternative headlight brackets 40, 41 equipped with alternate headlights 50, 51. These alternative headlights are suitably located above the snowplow blade (not shown). Such headlights are required when the snowplow is in use because the blade blocks the light from the vehicle's regular headlights.

The uppermost end of each upright includes a pin and a pin-receiving hole which is used for attaching a lifting plate 60 to the uprights 30, 31. Pin-receiving holes house loosely-fit pins 61, 62 which are used to swingably fasten lifting plate 60 at a pair of upper pivot points at the uppermost ends of the uprights 30, 31. Lifting plate 60 is pivotable about these pins 61, 62 under control of a power driven ram 70.

Figure 5:
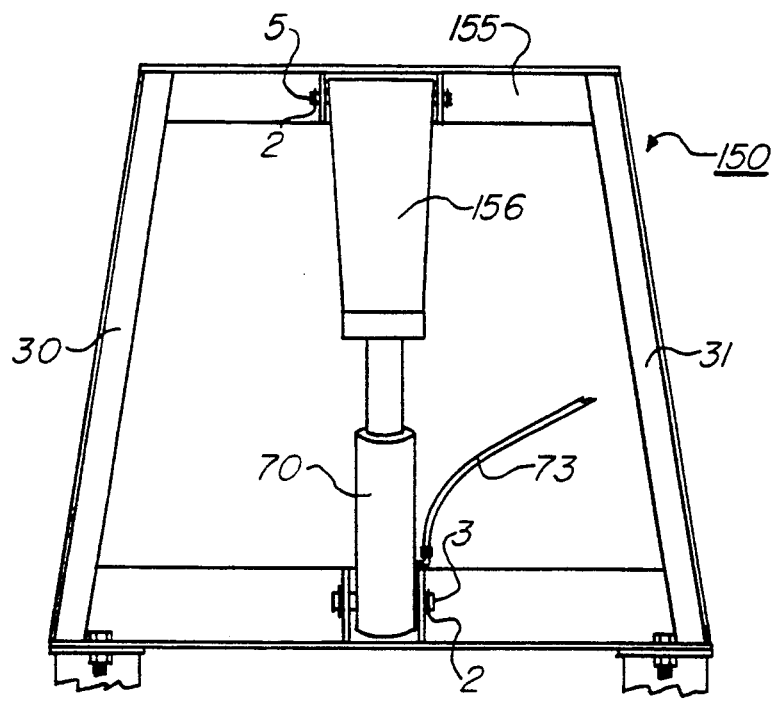
FIG. 5 illustrates another type of prior art snowplow headgear in a snowplow ready configuration.

Lifting plate 60, when installed in an initial position extends forward and downward at a slight incline. As shown in FIG. 1, plate 60 is pinned or otherwise fastened to the travelling end of ram 70. Lifting plate 60 of FIG. 1 is triangular in shape while the lifting plate 156 of FIG. 5 is rectangular in shape. In either event, however, the travelling, or power, end of a ram 70 controls the height of the snowplow blade by positioning the lifting plate to which a snowplow chain is attached. Lifting plate 60, 156 in FIG. 1 or FIG. 5 includes a hook (not shown) adapted to seize and hold a snowplow blade's chain.

Base 71 of the ram 70 is securely connected at the middle of the lower horizontal support 22 in a base receiving socket 23. Although the sockets vary with manufacture most of them are open at the front and have a right angle bracing structure at the rear. Often the ram 70 is of the type that is hydraulically-driven. Fluid under pressure is delivered to ram 70 via hose and coupler fixture 73 to ram 70. As ram 70 is extended by operator control, vehicle-supplied driving pressure inside ram 70, in a well known manner, extends the ram's travelling end away from base end 71. As ram 70 is extended, ram 70 lifts and otherwise controls the blade (not shown) by raising and/or lowering lifting plate 60 about its pivot points 61, 62.

In accordance with this invention, the user must first remove certain given components of the headgear 120 before installing the novel front-mounted tire/wheel assembly of this invention. Thus, an operator must disconnect the ram hose 73 at its coupling, or threaded female/male type fitting from ram 70. Remove the pin from the traveling end of ram 70 so that ram 70 may be separated from lifting plate 60. Lifting plate 60 is removed and such removal requires the removal of pins 61 and 62 at the upper ends of uprights 30, 31. Often the pins 61 and 62 are simply retained in place by retaining clips of a well known type. Other types of headgear, rather retaining pins, employ bolt/nut combinations and herein these terms shall be treated as interchangeable fastening means.

Once the lifting plate 60 has been removed, the base end 71 of ram 70 is removed from its attachment location in receiving socket 23. As shown in FIG. 1, receiving socket 23 is positioned at the mid-point of lower horizontal support rail 22. Retaining pin 3, and retaining clip 2 are commonly used to hold ram 70 in receiving socket 23. The pin and clip may subsequently be used to install the invention's support post in that same receiving socket 23. With these elements removed, the snowplow headgear 120 is now ready to receive the front-mounted tire/wheel assembly rack of the invention.

Figure 2:
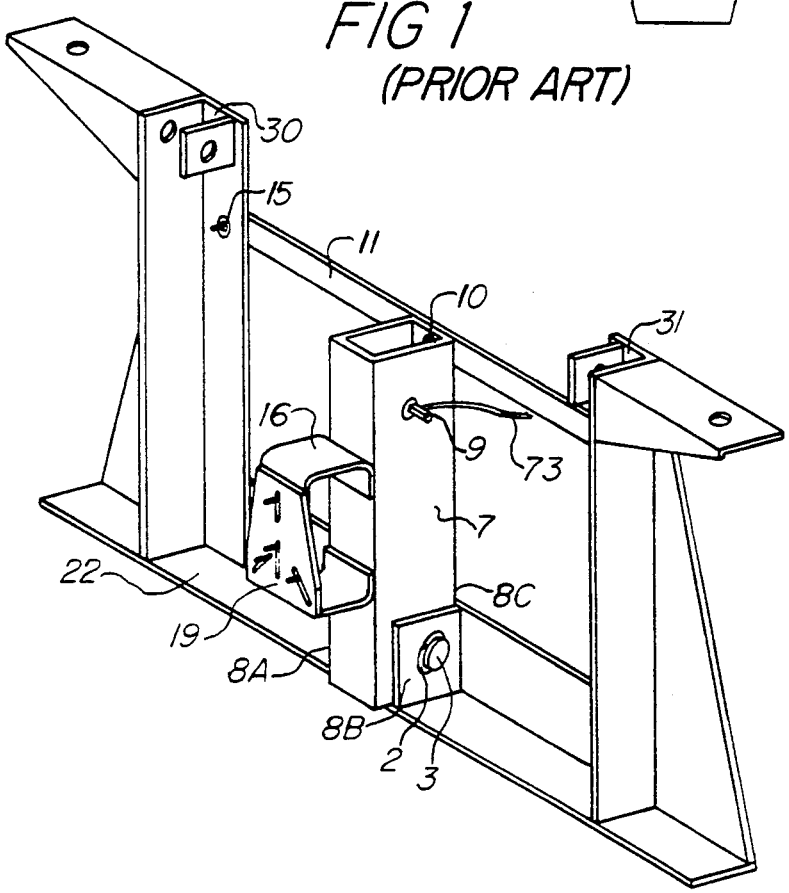
FIG. 2 shows a perspective view of a front-mounted spare tire/wheel rack of the invention installed on the snowplow headgear illustrated in FIG. 1.

Referring now to FIG. 2, for installation the user will insert the tire support post 7 into the lift cylinder support socket 23. The lower end of 7 is provided with an attachment hole 6 (see FIG. 3B) which passes through both sides of post 7. Hole 6 is aligned with and matches the pin-receiving holes in socket 23.

Socket 23 is an open-faced four-sided type recess formed by a pair of parallel upstanding left and right ribs 8A and 8B, a rear portion 8C of the rear plate of horizontal member 22 and the upper surface of horizontal member 22 itself. The post receiving socket 23, has its holes aligned with hole 6 in the lower end of tire support post 7 in order to receive a pin 3 that passes through these holes. A retaining clip 2 is placed within a retaining clip groove in the end of pin 3 in order to secure post 7 into socket 23.

An upper horizontal support bar 11, FIG. 2, is bolted into position behind the headgear vertical supports 30, 31 and is located so that it is approximately level with the lower horizontal support 22. Some snowplow headgear are provided with several matching pre-drilled holes in the uprights 30, 31. Several of these attachment holes are normally left vacant and the invention uses a pair of these vacant hole in order to bolt the upper horizontal bar 11 into place on the vertical uprights 30, 31 on headgear 120.

In FIG. 2 for installation, it is necessary to insert a bolt 10 through aligned mating holes located in the bar 11 and in the upper back side of the upright tire support post 7. The center hole 13, FIG. 4C, in the horizontal support 11 (also shown in FIG. 4C) receives bolt 10. Post 7 is first loosely attached to the horizontal bar 11 by using a lock washer and/or lock nut. Bolt 10 is most conveniently installed through the inside of the tire support post 7 with the threads emerging through the back face of the horizontal bar 11, and an elastic lock nut being used to securely tighten the pieces together. An alternative way of fastening the pieces together is shown in cutaway view in FIG. 3B. There the threads of bolt 10 pass through a mated opening 13 (shown in cut-away cross section in FIG. 3B) in the upper horizontal member 11 and come forward into the interior of support 7. Nut 10A may be an elastic lock nut or it may be spot welded to the inside of post 7 as desired. In either event post 7 at its upper end is tightly fastened to the upper horizontal support 11.

In accordance with my invention, tire support post 7 is also provided near its upper end with a storage fitting 9, FIG. 2, adapted to mate with the disconnected hydraulic line coupler 73. This fitting 9 may be a quick disconnect, threaded or any other well known fitting that mates with the end as supplied with the snowplow unit. This storage coupling 9 is sealed, or otherwise blocked, so that hydraulic fluid in line 73 will not leak out from the line. The location of storage coupler 9 is near the top of post 7 so that it is readily accessible for connection and disconnection during a transition from front-mounted tire/wheel assembly to snowplow usage or vice-a-versa.

FIG. 4C shows a plan view of horizontal bar 11. Dimensions for the horizontal bar 11 are such that a pair of opposed vacant openings in the upright pair 30, 31 will normally align with corresponding elongated openings 11A and 11B which are located at each end of the horizontal bar 11 as shown in FIG. 4C. Horizontal bar 11 thus include two slightly oversized elongated slots 11A and 11B which are conveniently sized to accommodate most if not all of the varying widths between the uprights 30 and 31 as used for a variety of different length snowplow blades.

In operation, a bolt, washer and nut combination at each end of horizontal bar 11 is tightened and is used to securely fasten the upper horizontal bar 11 to and across the uprights 30, 31 in the manner shown in FIG. 2. Another alternative is to weld horizontal bar 11 in place onto uprights 30 and 31 and simply leave it welded at that location since it does not interfere with snowplow unit operation nor the removal of the headgear itself.

This invention provides an alternative manner of fastening horizontal bar 11 to uprights 30, 31 by using a pair of a sandwich-like clamp brackets located one each at each end of bar 11. One of these clamp brackets is depicted as bracket 13A in FIGS. 4A and 4B. Each clamp bracket, such as 13A, is loosely bolted to horizontal bar 11 and when tightened seizes by compressive force the upright 31 (shown partially broken away in FIG. 4B).

The offset of camp 13A provides a space between 13A and bar 11, which space is somewhat under-configured with respect to the thickness of upright 31. This dimensioning, as the bolt/nut combination 15 is tightened, forms a clamping action between clamp 13A, bar 11 and upright 31. The two inside faces of the sandwich formed by the rear bar 11 and clamp 13A compressively seize the thickness of upright 31 and form a snug, or compressive force fit as bolt 15 is securely tightened. This alternative attachment method and structure does not rely upon any pre-drilled hole locations in uprights 30, 31.

It is also possible, of course, to utilize another lower horizontal support in cooperation with an additional hole and bolt in post 7 by attaching the lower end of the tire support post 7 to a lower bracket (not shown) which lower bracket is also bolted or otherwise attached at the lower end of the upright pair as a substitute in place of pin 3 in receiving socket 23. In either event however, receiving socket 23 provides solid support for the upright post 7. The alternative clamping method may be required due to variations in manufacturing tolerances and dimensions for the pin of socket 23.

It should be noted that the upper (and alternative, if used) horizontal support(s) can, once they are attached, be left in position after the front-mounted tire support is removed. The presence of such supports will not interfere with the snowplow operation.

FIG. 3B depicts a partially cut away side view of a tire mount 16 which is also shown in perspective view in FIG. 2. With reference now to FIG. 3A tire mount 16 is attached to the forward facing side of support post 7 by welding at a predetermined height to insure both forward driving visibility for the vehicle's driver and adequate ground clearance for the bottom of the mounted tire/wheel assembly. A front face of the tire mount 16 has two holes drilled therein to accept bolts 17 and 18. Bolt 18 is centrally located on the front face of tire mount 16 and bolt 17 is placed at the upper portion of the face. Both bolts may be welded in position at the bolt head on the inside surface of mount 16.

Mounting plate 19, FIG. 3A, is a steel plate with two elongated centrally located slots 21 spaced one above the other, and two diagonally located slots 24 positioned on an angle with respect to the alignment of slots 21. The mounting plate 19 provides added stability by increasing the bearing surface area over that smaller front-facing area of tire mount 16. Also angled slots 24 are provided in 19 in order to provide a universal mounting for the numerous wheel lug hole arrangements of different vehicle manufacturers.

In use, the mounting plate 19 is placed over bolts 17 and 18. The vehicle tire/wheel assembly is placed over the tire mount taking care to align one of the wheel lug bolt holes with bolt 17. Once the assembly is set in place it is secured loosely with a nut. Working with one hand behind the tire, the user aligns the mount plate 19 so that a bolt 26, FIG. 3A, will pass through both slot 24 and a lug bolt hole in the tire/wheel assembly. The user then repeats the assembly for the other slot 24 and tightens the three nuts securely. The user then tightens a nut on center bolt 18 and tightens it securely. This procedure grips and maintains the bolt/lug nut alignment for future tire/wheel removal/installation. A tire/wheel assembly is further held in place by a hub retaining bracket 20 as shown in FIG. 3C, and a suitable hole for a padlock may be provided in the end of bolt 18 to help prevent theft of the tire/wheel assembly.

In FIG. 5 an O-shaped headgear 150 known in the art is depicted. This alternate type headgear, as provided to the user/owner from the snowplow manufacturer, already has an upper horizontal rail, or bar 155, across the top of the uprights 30, 31. That upper bar 155 receives a rectangular shaped lifting plate 156 rather than the triangular-shaped lifting plate 60 described earlier in connection with FIG. 1.

In the instance of FIG. 5, however, the invention does not require that a horizontal support bar 11 need be supplied to the user. Instead, the user receives a tire support post 7, a tire/wheel mount and mounting plate of the type in FIG. 3 and an upper post attachment 14, as shown in FIG. 6.

Figure 6:
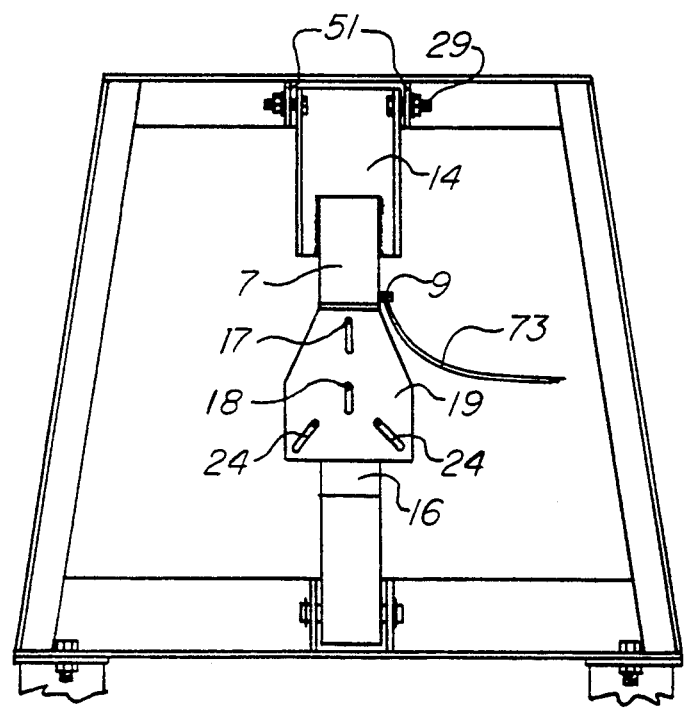
FIG. 6 shows the snowplow headgear front-mounted spare tire rack installed on the snowplow headgear illustrated in FIG. 5.

In FIG. 6 the upright post 7 is supported in upper and lower sockets that are already available in the manufactured headgear 150. As shown, the headgear of FIG. 6 involves a different method of installing the upper end of tire support post 7. In this embodiment, the upper end of the tire support post 7 has welded to its back side a U-shaped channel 14 with the open portion of the U channel facing forward. U channel 14 is chosen with a width dimension which allows it to fit within the upper lift arm bracket 51. The upper outside walls of the U channel 14 have properly positioned holes drilled therein, which holes align with the holes in the lift arm bracket 51. Bolts 29 are then placed through these holes and secured with washers and nuts. The views of FIGS. 5 and 6 taken in conjunction with the earlier description are not deemed to require any further description since many of the principles of the invention will readily be understood by one of ordinary skill in the art from my earlier description.

In use, the entire tire/wheel assembly together with post 7 may be removed as a unitary piece. Thus, with the tire/wheel assembly still installed on the upright post 7, one simply reaches behind the spare tire and removes lower lift cylinder pin 2 and retainer clip 3. Lift cylinder hose 73 is then disconnected from its storage position, and bolt 10 (which holds the tire support post at its upper end to the horizontal bar 11) is removed. By this simple process, mounted spare tire/wheel and rack may be removed together and stored for later installation.

Those skilled in the art will appreciate that the conception, upon which this disclosure is based, may be readily used as a basis for other carrying devices. It is important, therefore, that the claims be regarded as including such equivalent constructions insofar as they do not depart from the spirit and scope of the present invention.

While my invention has been described with reference to a particular example of preferred embodiments, it is my intention to cover all modifications and equivalents within the scope of the following claims. It is therefore requested that the following claims, which define my invention, be given a liberal interpretation which is within the spirit and scope of my contribution to this art.

What is claimed is:

1. A method of front-mounting a spare tire/wheel assembly on a snowplow headgear on a vehicle without requiring removal of the headgear, but instead uses the headgear as a fastening and supporting structure for a tire/wheel assembly; said headgear being fastened to a vehicle frame and including a lower horizontal support member having a pair of ends, a pair of substantially vertical uprights connected to the ends of the horizontal support member to form a support headgear structure, each of said uprights having an upper end with said structure being positioned essentially in front of the vehicle; said headgear further normally having an installed power ram provided with a power end and a base end, with the base end of the ram being secured in a receiving socket that is located at a mid-point on an upper surface of the horizontal support member and the power end of said ram extending upright to a lifting plate normally used for controlling a snowplow blade, the method comprising the steps of:
   removing the power ram and lifting plate from the snowplow headgear;
   securing an upright post, having an upper end, a lower end and a centrally mounted forward-facing tire mounting base fastened thereon, on said lower horizontal support member by placing the lower end of said post within said receiving socket that had previously been occupied by the base end of said power ram;
   locating a second horizontal bar across the upper end of said upright supports;
   fastening the upper end of said post to said second horizontal bar with said tire and wheel brace centrally-located within said uprights; and
   mounting a tire/wheel mounting plate adapted to house a spare tire/wheel assembly thereon onto said mounting base.

2. A method of front-mounting a spare tire/wheel assembly for use on a snowplow-equipped vehicle in accordance with claim 1, wherein the method includes the additional step of:
   installing on the headgear the spare tire/wheel assembly and the upright post to which it is attached as a single unit.

3. A method of front-mounting a spare tire/wheel assembly for use on a snowplow-equipped vehicle in accordance with claim 1 wherein the power ram is hydraulically driven by a hydraulic line connected to the hydraulic ram, and wherein the method includes the additional step of:
   storing the disconnected hydraulic line on the post while the tire/wheel assembly is on the vehicle.

4. A method of front-mounting a spare tire/wheel assembly for use on a snowplow-equipped vehicle in accordance with claim 3 and wherein the method includes the additional step of:
   storing the hydraulic line on a sealed connector located on the upright post in order to prevent loss of hydraulic fluid by leakage from said hydraulic line.

5. A method of front-mounting a spare tire/wheel assembly for use on a snowplow-equipped vehicle in accordance with claim 1 and wherein the method step of securing said upright post in said receiving socket, includes the additional steps of:
   aligning holes located in the base end of said upright post with mated openings located in said receiving socket;
   placing a securing pin though the aligning holes in the upright post and the openings in the receiving socket; and
   retaining the securing pin in place in order to fasten said upright post firmly to said horizontal support structure of said headgear.

6. A method of front-mounting a spare tire/wheel assembly for use on a snowplow-equipped vehicle in accordance with claim 1 and wherein the method step of locating said second horizontal bar across the upper end of said headgear uprights includes the additional steps of:
   placing compression clamps on each end of said bar;
   seizing the headgear uprights by said compression clamps; and
   imparting a compressive force to said clamps, which force rigidly retains said second horizontal bar across said uprights.

7. A method of front-mounting a spare tire/wheel assembly for use on a snowplow-equipped vehicle in accordance with claim 6 and wherein the method step of locating said second horizontal bar across the upper end of said headgear uprights includes the additional step of:
   holding the compressive clamps to the horizontal bar by a tightening means; and
   placing an offset in the shape of each compressive clamp that allows the thickness of the upright to be seized by each of the compressive clamps.

8. A method of front mounting a carrier assembly on a snowplow headgear on a vehicle that is fastened to a front of a said vehicle and extends beyond the front of the vehicle, with said headgear including a lower horizontal support member having a pair of ends, and a pair of substantially vertical headgear uprights at the ends of the horizontal support member, said headgear further having a power ram with a base end removably secured in a receiving socket that is centrally located on the horizontal support member, the method comprising the steps of:
   removing the power ram from the headgear; and
   securing an upright post having a centrally mounted forward facing carrier assembly thereon, in said receiving socket previously occupied by said power ram;
   positioning said upright post centrally between said headgear uprights; and
   fastening an upper end of said upright post across said headgear uprights.

9. A method of front mounting a carrier assembly on a snowplow headgear in accordance with claim 8 and comprising the further method steps of:
   pinning the upright post at a lower end in said receiving socket with a fastening means.

10. A method of front mounting a carrier assembly on a snowplow headgear in accordance with claim 8 and comprising the further method steps of:
- fastening a second horizontal support bar across the vertical uprights near uppermost ends of said uprights at a location behind said upright post; and
- fastening the upper end of said upright post to said second horizontal bar at a mid-point of said second horizontal bar to form a T-shaped tire/wheel brace within said headgear uprights.

11. A method of front mounting a carrier assembly on a snowplow headgear in accordance with claim 8 and comprising the further method steps of:
- mounting a tire-receiving base essentially at the center of the headgear structure; and
- mounting a tire and wheel mounting plate capable of receiving a spare tire/wheel assembly on said tire-receiving base.

12. A front-mount spare tire/wheel in combination with a snowplow headgear for use on a vehicle having a frame, the combination comprising:
- a headgear adapted to be fastened to a front of the frame and extend beyond the front of the vehicle, with said headgear including;
- a lower horizontal support member having a pair of ends;
- a pair of substantially vertical headgear uprights at the ends of the horizontal support member; said headgear further having
- a power ram base-receiving socket that is centrally located on the headgear horizontal support member; and
- an upright post having a centrally mounted forward facing tire/wheel assembly thereon;
- means fastening said upright post in said power ram base-receiving socket; and
- means positioning said upright post at a central location between said headgear uprights.

13. A front-mount spare tire/wheel in combination with a snowplow headgear in accordance with claim 12 and further comprising:
- a second horizontal bar positioned at upper ends of said headgear uprights; and
- means fastening an upper end of said upright post to said second horizontal bar at a mid-point between said headgear uprights.

14. A front-mount spare tire/wheel in combination with a snowplow headgear in accordance with claim 13 wherein said fastening means at the upper end of said upright post further comprises:
- a forward facing channel iron fastened at a lower end to the upper end of said upright post; and
- means at an upper end of said channel iron for affixing said channel iron to said second horizontal bar.

15. A combination in accordance with claim 12 wherein the combination further includes:
- a sealed connector adapted for receiving and storing a hydraulic line on the upright post while the tire/wheel assembly is on the vehicle.

* * * * *